(12) United States Patent
Norrie et al.

(10) Patent No.: US 11,035,997 B2
(45) Date of Patent: Jun. 15, 2021

(54) LIGHT-EMITTING INDICATOR

(71) Applicant: NCR Corporation, Duluth, GA (US)

(72) Inventors: David Knight Norrie, Angus (GB); Mark Robert Forsyth Smith, Perthshire (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/719,188

(22) Filed: Sep. 28, 2017

(65) Prior Publication Data
US 2019/0094452 A1    Mar. 28, 2019

(51) Int. Cl.
| F21V 8/00 | (2006.01) |
| F21V 23/00 | (2015.01) |
| G07F 7/08 | (2006.01) |
| F21Y 115/10 | (2016.01) |
| F21W 111/00 | (2006.01) |

(52) U.S. Cl.
CPC .......... *G02B 6/0068* (2013.01); *F21V 23/003* (2013.01); *G02B 6/006* (2013.01); *G02B 6/0041* (2013.01); *G07F 7/0873* (2013.01); *F21W 2111/00* (2013.01); *F21Y 2115/10* (2016.08)

(58) Field of Classification Search
CPC .... G02B 6/0068; G02B 6/0041; G02B 6/006; F21V 23/003; F21W 2111/00; F21Y 2115/10; G07F 7/0873
See application file for complete search history.

(56) References Cited

U.S. PATENT DOCUMENTS

| 2010/0020528 A1* | 1/2010 | Feit ................. | G01D 11/28 362/23.15 |
| 2011/0011935 A1* | 1/2011 | Takahashi ........... | G07F 7/0873 235/439 |
| 2012/0155060 A1* | 6/2012 | Ninan ................ | G09G 3/003 362/84 |
| 2014/0056028 A1* | 2/2014 | Nichol ............... | G02B 6/0028 362/611 |
| 2014/0204606 A1* | 7/2014 | Smits ................. | G02B 6/0008 362/558 |
| 2015/0098205 A1* | 4/2015 | Keranen .............. | G01D 11/28 362/23.01 |
| 2015/0176790 A1* | 6/2015 | Svettini ............. | F21S 48/00 362/606 |
| 2015/0355505 A1* | 12/2015 | Overes ............... | G02B 6/0075 349/62 |
| 2016/0085022 A1* | 3/2016 | Yang .................. | G02B 6/0096 362/23.08 |

* cited by examiner

*Primary Examiner* — Sonji N Johnson
(74) *Attorney, Agent, or Firm* — Schwegman, Lundberg & Woessner

(57) ABSTRACT

A light-emitting indicator can include a molded, transparent housing formed with a central area shaped as a square that extends in a plane. A plurality of light emitting diodes, optionally formed integrally with the housing, can be positioned along edges of a square that surrounds the central area. The light emitting diodes can emit light to propagate inside the housing toward the central area. A light guide, optionally formed integrally with the housing, can be positioned in a peripheral area shaped to include an area between two concentric squares that surround the central area. The light guide can direct the emitted light out of the plane. Control circuitry can be positioned along the edges of the square that includes the light emitting diodes. The control circuitry can cause the light emitting diodes to blink at a specified frequency, which can draw the attention of a user.

20 Claims, 3 Drawing Sheets

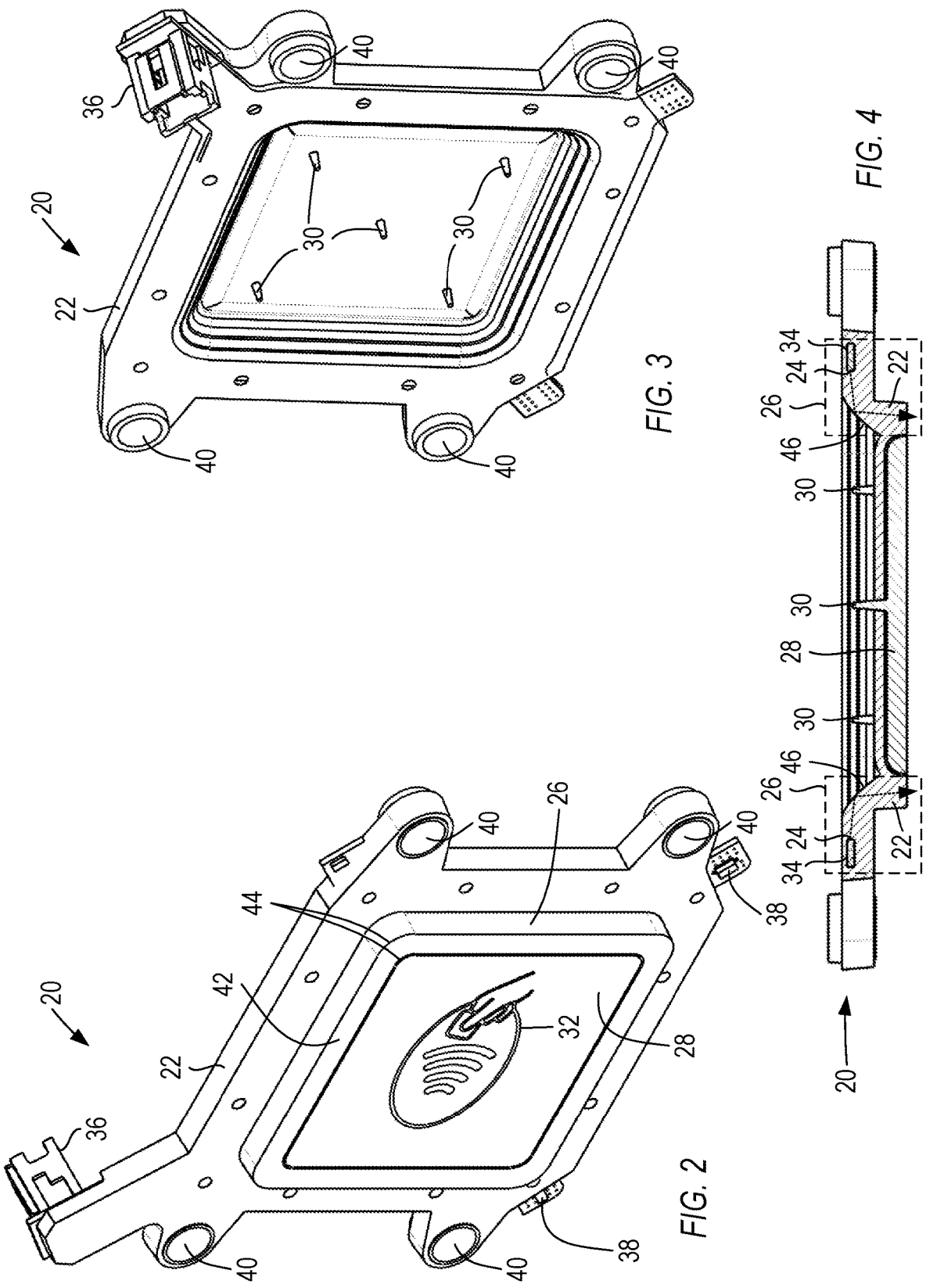

LIGHT-EMITTING INDICATOR

TECHNICAL FIELD

The present disclosure relates to a method for light-emitting indicator, such as an indicator that can blink to draw the attention of a user.

BACKGROUND

Some devices can use indicators to draw the attention of a user. For example, a contactless card reader can use a media entry/exit indicator to flash a light toward a user at a particular time during a transaction. The flashing light can prompt the user to tap a card or other device at a particular location on the contactless card reader. There is ongoing effort to improve these and other indicators.

SUMMARY

In a first example, a light-emitting indicator can include: a housing formed with a central area that extends in a plane; a plurality of light emitting diodes configured to emit light to propagate inside the housing toward the central area; and a light guide positioned in a peripheral area surrounding the central area and configured to direct the emitted light out of the plane.

In a second example, a method can include: generating light with a plurality of light emitting diodes; propagating the generated light inside a housing toward a central area of the housing, the central area extending in a plane; and, with a light guide that surrounds the central area, directing the emitted light out of the plane.

In a third example, a light-emitting indicator can include: a molded, transparent housing formed with a central area shaped as a square that extends in a plane; a plurality of light emitting diodes formed integrally with the housing, positioned along edges of a square that surrounds the central area, and configured to emit light to propagate inside the housing toward the central area; a light guide formed integrally with the housing, positioned in a peripheral area shaped to include an area between two concentric squares that surround the central area, and configured to direct the emitted light out of the plane, wherein in a cross-section of the light guide taken orthogonal to the plane of the central area, the light guide includes a rounded corner shaped to reflect the light out of the plane, the rounded corner having a convex side that faces the central area and a concave side that faces away from the central area; and control circuitry positioned along the edges of the square that includes the light emitting diodes and configured to cause the light emitting diodes to blink on and off at a specified frequency.

BRIEF DESCRIPTION OF THE DRAWINGS

The present disclosure is illustrated by way of example and not limitation in the figures of the accompanying drawings, in which like reference numbers indicate similar elements.

FIG. 2 shows the front side of an example of a light-emitting indicator, in accordance with some embodiments.

FIG. 3 shows the back side of the light-emitting indicator of FIG. 2, in accordance with some embodiments.

FIG. 4 shows a cross-section of the light-emitting indicator of FIGS. 2-3, in accordance with some embodiments.

Figure 1:
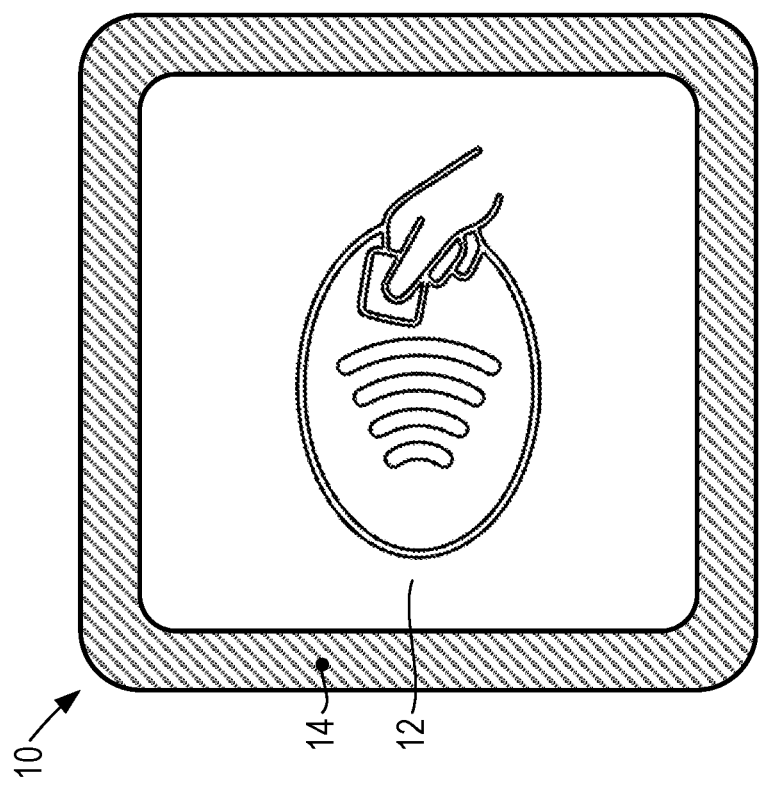
FIG. 1 shows an example of a user-visible portion of a light-emitting indicator, in accordance with some embodiments.

It should be noted that elements in the drawings are not necessarily drawn to scale. The configurations shown in the drawings are merely examples, and should not be construed as limiting in any manner.

DETAILED DESCRIPTION

Some devices can use indicators to draw the attention of a user. For example, a contactless card reader can use a media entry/exit indicator to flash a light toward a user at a particular time during a transaction. The flashing light can prompt the user to tap a card or other device at a particular location on the contactless card reader.

For example, a known indicator can include light-emitting diodes, circuitry that can power the light-emitting diodes, and a housing that can mechanically support the light-emitting diodes and the circuitry. In this known indicators, the indicator elements can be formed discretely, then assembled. One drawback of using discrete elements is that it can increase the number of inventory parts required to manufacture or repair the indicator. Another drawback is that the assembled elements can take up a relatively large area on the device, or can be excessively thick.

The light-emitting indicator discussed in detail below can overcome these drawbacks by integrating the light-emitting diodes and the circuitry into the housing. The light-emitting indicator can include a central area, which can optionally include a contactless reader, a slot configured to accept a card, or other suitable media reader. The light-emitting indicator can include a light guide that surrounds the central area, and light-emitting diodes that surround the light guide. The light-emitting diodes can emit light toward the central area, e.g., in a plane that parallel to a fascia of the device. The light guide can bend the emitted light out of the plane, toward a user. By integrating the light-emitting diodes and the circuitry into the housing, the light-emitting indicator can be made thinner and/or smaller than a comparable discretely-assembled indicator, and can be made as a single element, which can reduce the burden on inventory and assembling techniques.

FIG. 1 shows an example of a user-visible portion 10 of a light-emitting indicator, in accordance with some embodiments. The light-emitting indicator can be positioned on a fascia of a device (e.g., the portion of the device facing a user). Suitable devices can include a contactless card reader, an automated teller machine, an information terminal, a printer kiosk, and others.

A user can see the visible portion 10 of the light-emitting indicator. The center of the visible portion 10 can include a decal 12. The decal 12 can include an image or an icon corresponding to a particular task to be executed by the user. In some examples, the image or icon be included on an adhesive sticker, which can be stuck onto a rigid base. In other examples, the image or icon can be formed onto a user-facing surface of a molded part. In the example of FIG. 1, the icon can instruct a user to tap a card. This is but one example; other suitable tasks can also be used. In some examples, a contactless card reader can be positioned behind the decal 12, so that a user positioning a card proximate the decal can have the card read by the contactless card reader. In some examples, the center of the visible portion 10 can include a media insertion slot, which can accept a card or other media that can require contact. In some examples, the center of the visible portion can lack an image or icon if it is fitted with a part referred to as a blank.

The decal 12 can be surrounded by a light-emitting area 14. The device can call the user's attention to the decal 12 by turning on or flashing light to the user in the light-emitting area 14. For example, when the device is performing a task that requires the user to tap a card, the device can flash light toward the user from the light-emitting area 14. When the device senses that the card has been tapped and read by the device, the device can cease the flashing from the light-emitting area 14.

When the light-emitting area 14 is switched on, the emitted light can blink on and off at a specified frequency (e.g., between 1 and 10 Hz), can switch between a low power level and a high power level at a specified frequency, or can remain on. The emitted light can include a single wavelength (e.g., green light, red light, or blue light), or a combination of wavelengths. In some examples, the light-emitting area can emit green light to correspond with a positive message for the user (e.g., a card was read successfully), or red light to correspond with a negative message for the user (e.g., the card was not read successfully). In some examples, the light can be produced by colored light-emitting diodes, such as green, red, blue, or another suitable color. In other examples, the light can be produced by white-light light emitting diodes, and a wavelength selective filter in or on the light-emitting area 14 can determine a color of the output light.

The decal 12 and light-emitting area 14 are typically the only portions of the light-emitting indicator that are visible to a user. The fascia of the device can hide portions of the light-emitting indicator that extend laterally beyond the light-emitting area 14. FIGS. 2-4 below show an example of a full light-emitting indicator, including the portions hidden by the fascia.

FIG. 2 shows the front side of an example of a light-emitting indicator 20, in accordance with some embodiments. FIG. 3 shows the back side of the light-emitting indicator 20 of FIG. 2, in accordance with some embodiments. FIG. 4 shows a cross-section of the light-emitting indicator 20 of FIGS. 2-3, in accordance with some embodiments. The light-emitting indicator 20 shown in FIGS. 2-4 is but one configuration of such a light-emitting indicator 20; other configurations can also be used.

The light-emitting indicator 20 can include a housing 22. In some examples, the housing 22 can be molded and transparent. The housing 22 can be formed from a moldable plastic material, such as polycarbonate. The housing 22 can be formed with a central area that extends in a plane. In some examples, the central area can be shaped as a square, although other suitable shapes can be used. For example, an automated teller machine can include a central area shaped as a relatively wide, relatively short rectangle, which can surround a horizontally-oriented slot that can accommodate a credit card. Other shapes can also be used, depending on the particular application of the device.

The light-emitting indicator 20 can include a plurality of light emitting diodes 24. The light emitting diodes 24 can be positioned along edges of a square that surrounds the central area. The light emitting diodes 24 can emit light to propagate inside the housing 22 toward the central area. In some examples, the light emitting diodes 24 can be formed integrally with the housing 22. In other examples, the light emitting diodes 24 can be formed separately from the housing 22 and then attached to the housing 22. In some examples, the light emitting diodes 24 can all emit light at the same wavelength. In other examples, at least two of the light emitting diodes 24 can emit light at different wavelengths.

The light-emitting indicator 20 can include a light guide 26. The light guide 26 can be positioned in a peripheral area 42 surrounding the central area. In some examples, the peripheral area 42 can be shaped to include an area between two concentric squares that surround the central area. The squares can have rounded corners 44. In some examples, the light emitting diodes 24 can be positioned along edges of a square that surrounds the peripheral area 42. The light guide 26 can receive the light emitted from the light emitting diodes 24, and direct the emitted light out of the plane of the central area. In some examples, the light guide 26 can be formed integrally with the housing 22. In some examples, the light guide 26 can be positioned between the central area and the light emitting diodes 24. In a cross-section of the light guide 26 taken orthogonal to the plane of the central area, the light guide 26 can include a rounded corner 46 shaped to reflect the light out of the plane. The rounded corner 46 can have a convex side that faces the central area, and a concave side that faces away from the central area. Other cross-sectional features can also be used, in addition to or instead of the rounded corner 46.

In some examples, the light guide 26 can include one or more diffusing elements, which can redistribute light within the light guide 26 to make the emitted light appear more uniform. Such diffusing elements can include a plurality of small particles embedded within the light guide 26. In some examples, the small particles have a refractive index slightly different from that of a bulk material of the light guide 26, so that the small particles can scatter the light that is guided by the light guide 26. In some examples, the small particles can be formed from an opaque and/or absorbing material, which can reduce the amount of light that is guided by the light guide 26. In some examples, the small particles can attenuate the light that is guided by the light guide 26, which can reduce the apparent brightness of the light-emitting indicator 20. This can be beneficial for a light-emitting indicator 20 that uses relatively bright light emitting diodes 24.

The light-emitting indicator 20 can include a decal 28. The decal 28 can attach to the housing 22 at the central area. In some examples, the decal 28 can be shaped to substantially fill the central area, such as to a reasonable manufacturing and assembly tolerance. In some examples, the decal 28 can be formed from a plastic material, optionally an opaque plastic material. In some examples, the decal 28 can be formed discretely from the housing 22, then attached to the housing 22. The decal 28 can include a plurality of pins 30 that extend through the housing 22 through corresponding holes in the central area. In some examples, the pins 30 can be hot riveted to the housing 22, thereby attaching the decal 28 to the housing 22. Other suitable attachment mechanisms can also be used. In some examples, the decal 28 can include an image or a logo 32 that is recognizable to a user, and can instruct the user to perform a particular task, such as holding a readable card to a reader location.

The light-emitting indicator 20 can include control circuitry 34. In some examples, the control circuitry 34 can be positioned along the square that includes the light emitting diodes 24. The control circuitry 34 can control the light emitting diodes 24. In some examples, the control circuitry 34 can cause the light emitting diodes 24 to blink on and off at a specified frequency. In other examples, the control circuitry 34 can power the light emitting diodes 24, and optional blinking can be controlled externally by switching the power to the control circuitry 34 on and off at a specified frequency. In some examples, the light emitting diodes 24 can be formed integrally with the housing 22. Forming the light emitting diodes 24, the light guide 26, and the control circuitry 34 integrally with the housing 22 can allow the light-emitting indicator 20 to be thinner than if these elements were formed separately from the housing 22, then attached to the housing 22.

The light-emitting indicator 20 can include a connector 36 attached to a corner of the housing 22. The connector 36 can electrically couple to the control circuitry 34, and can supply power to the control circuitry 34. The connector 36 can be shaped to mate with a corresponding connector via motion that is orthogonal to the plane of the central area. In some examples, the control circuitry 34 can include at least one driver chip 38 positioned in a corner of the square that includes the light emitting diodes 24.

In some examples, the housing 22 can include multiple mounting holes 40, which can be used to attach the housing 22 to the fascia of the device. In a specific example, the housing 22 can include four mounting holes 40, each mounting hole 40 positioned adjacent a respective corner of the square that includes the light emitting diodes 24. The mounting holes 40 can extend through the housing 22, orthogonal to the plane of the central area.

Figure 5:
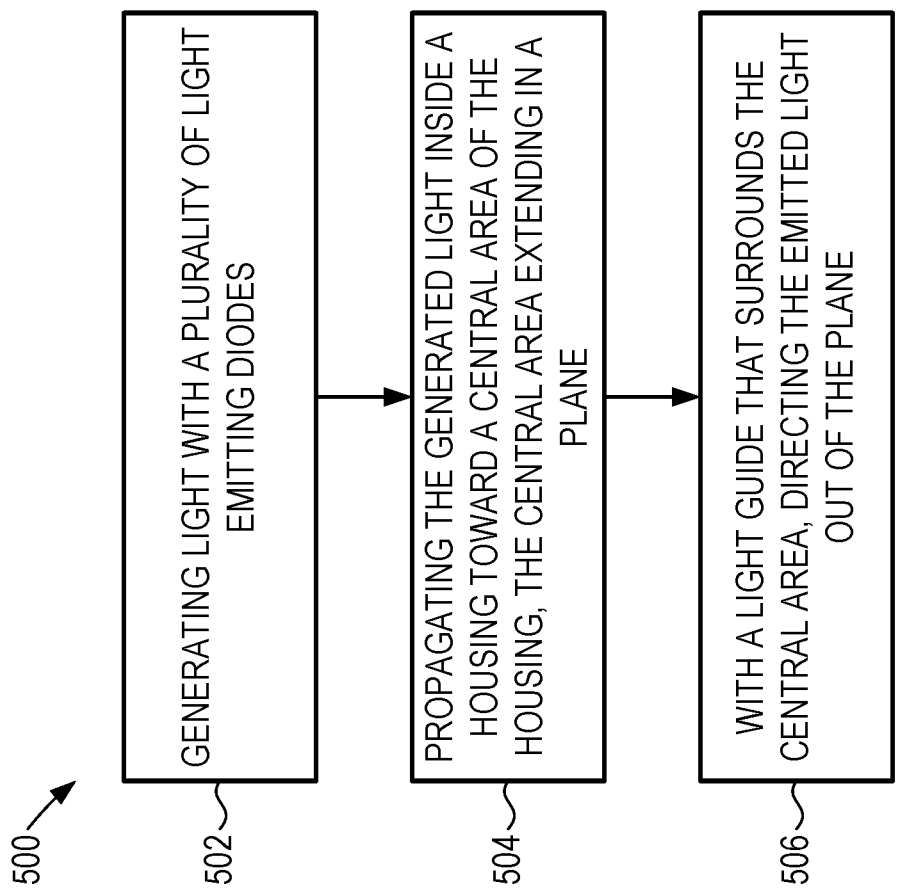
FIG. 5 shows an example of a method for operating a light-emitting indicator, in accordance with some embodiments.

FIG. 5 shows an example of a method for operating a light-emitting indicator, in accordance with some embodiments. The method can be executed by the light-emitting indicator 20 of FIGS. 2-4, as well as other suitable light-emitting indicator. The method 500 of FIG. 5 is but one example of a method for operating a light-emitting indicator; other suitable methods can also be used.

At operation 502, the light-emitting indicator can generate light with a plurality of light emitting diodes.

At operation 504, the light-emitting indicator can propagate the generated light inside a housing toward a central area of the housing, the central area extending in a plane.

At operation 506, the light-emitting indicator can, with a light guide that surrounds the central area, directing the emitted light out of the plane.

In some examples, the housing can be molded and transparent. In some examples, the light emitting diodes can be formed integrally with the housing. In some examples, the light guide can be formed integrally with the housing. In some examples, the light guide can be positioned between the central area and the light emitting diodes. In some examples, in a cross-section of the light guide taken orthogonal to the plane of the central area, the light guide can include a rounded corner shaped to reflect the light out of the plane. In some examples, with control circuitry configured to control the light emitting diodes, causing the light emitting diodes to blink on and off at a specified frequency.

What is claimed is:

1. A light-emitting indicator, comprising:
   a housing formed with a central area that extends in a plane, wherein the central area includes a media reader;
   a plurality of light emitting diodes configured to emit light to propagate inside the housing toward the central area; and
   a light guide positioned in a peripheral area surrounding the central area and configured to direct the emitted light out of the plane and thereby prevent the emitted light from entering the central area, the light guide including a bulk material with a first refractive index, wherein the light guide includes a diffusing element configured to redistribute the emitted light within the light guide, wherein the diffusing element includes a plurality of particles, the plurality of particles having a second refractive index different from the first refractive index of the bulk material, wherein the plurality of particles are located so as to scatter the emitted light directed by the light guide, wherein at least one particle of the plurality of particles attenuates the emitted light as it is directed by the light guide, and wherein the attenuation is accomplished by the at least one particle of the plurality of particles being formed from at least one of: an opaque material or an absorbing material to reduce a brightness level of the light-emitting indicator.

2. The light-emitting indicator of claim 1, wherein the housing is molded and transparent.

3. The light-emitting indicator of claim 1, wherein the light emitting diodes are formed integrally with the housing.

4. The light-emitting indicator of claim 1, wherein the light guide is formed integrally with the housing.

5. The light-emitting indicator of claim 1, wherein the light guide is positioned between the central area and the light emitting diodes.

6. The light-emitting indicator of claim 1, wherein in a cross-section of the light guide taken orthogonal to the plane of the central area, the light guide includes a rounded corner shaped to reflect the light out of the plane, the rounded corner having a convex side that faces the central area and a concave side that faces away from the central area.

7. The light-emitting indicator of claim 1, further comprising a decal attached to the housing at the central area and shaped to substantially fill the central area, the decal including a plurality of pins that extend through the housing through corresponding holes in the central area, the pins being hot riveted to the housing.

8. The light-emitting indicator of claim 1, further comprising control circuitry configured to control the light emitting diodes.

9. The light-emitting indicator of claim 8, wherein the control circuitry is configured to cause the light emitting diodes to blink on and off at a specified frequency.

10. The light-emitting indicator of claim 8, further comprising a connector attached to a corner of the housing and configured to electrically couple to the control circuitry, the connector shaped to mate with a corresponding connector via motion that is orthogonal to the plane of the central area.

11. The light-emitting indicator of claim 8, wherein:
    the central area is square;
    the peripheral area is shaped to include an area between two concentric squares that surround the central area; and
    the light emitting diodes are positioned along edges of a square that surrounds the peripheral area.

12. The light-emitting indicator of claim 11, wherein the control circuitry is positioned along the square that includes the light emitting diodes.

13. The light-emitting indicator of claim 12, wherein the control circuitry includes at least one driver chip positioned in a corner of the square that includes the light emitting diodes.

14. The light-emitting indicator of claim 11, wherein the housing includes four mounting holes, each mounting hole positioned adjacent a respective corner of the square that includes the light emitting diodes, the mounting holes extending through the housing orthogonal to the plane of the central area.

15. A method, comprising:
    generating light with a plurality of light emitting diodes;

propagating the generated light inside a housing toward a central area of the housing, the central area extending in a plane, wherein the central area includes a media reader; and with a light guide that surrounds the central area, the light guide including a bulk material with a first refractive index, directing the emitted light out of the plane to thereby prevent the emitted light from entering the central area, wherein the light guide includes a diffusing element configured to redistribute the emitted light within the light guide, wherein the diffusing element includes a plurality of particles, the plurality of particles having a second refractive index different from the first refractive index of the bulk material, wherein the plurality of particles are located so as to scatter the emitted light directed by the light guide, wherein at least one particle of the particles attenuates the emitted light as it is directed by the light guide, and wherein the attenuation is accomplished by the at least one particle of the plurality of particles being formed from at least one of: an opaque material or an absorbing material to reduce a brightness level of a light-emitting indicator.

16. The method of claim 15, wherein:

the housing is molded and transparent;

the light emitting diodes are formed integrally with the housing;

the light guide is formed integrally with the housing;

the light guide is positioned between the central area and the light emitting diodes; and in a cross-section of the light guide taken orthogonal to the plane of the central area, the light guide includes a rounded corner shaped to reflect the light out of the plane, the rounded corner having a convex side that faces the central area and a concave side that faces away from the central area.

17. The method of claim 15, further comprising:

with control circuitry configured to control the light emitting diodes, causing the light emitting diodes to blink on and off at a specified frequency.

18. A light-emitting indicator, comprising:

a molded, transparent housing formed with a central area shaped as a square that extends in a plane, wherein the central area includes a media reader;

a plurality of light emitting diodes formed integrally with the housing, positioned along edges of a square that surrounds the central area, and configured to emit light to propagate inside the housing toward the central area;

a light guide formed integrally with the housing, positioned in a peripheral area shaped to include an area between two concentric squares that surround the central area, and configured to direct the emitted light out of the plane and thereby prevent the emitted light from entering the central area, the light guide including a bulk material with a first refractive index, wherein in a cross-section of the light guide taken orthogonal to the plane of the central area, the light guide includes a rounded corner shaped to reflect the light out of the plane, the rounded corner having a convex side that faces the central area and a concave side that faces away from the central area, and wherein the light guide includes a diffusing element configured to redistribute the emitted light within the light guide, wherein the diffusing element includes a plurality of particles, the plurality of particles having a second refractive index different from the first refractive index of the bulk material, wherein the plurality of particles are located so as to scatter the emitted light directed by the light guide, wherein at least one particle of the plurality of particles attenuates the emitted light as it is directed by the light guide, and wherein the attenuation is accomplished by the at least one particle of the plurality of particles being formed from at least one of: an opaque material or an absorbing material to reduce a brightness level of the light-emitting indicator; and control circuitry positioned along the edges of the square that includes the light emitting diodes and configured to cause the light emitting diodes to blink on and off at a specified frequency.

19. The light-emitting indicator of claim 18, further comprising a connector attached to a corner of the housing and configured to electrically couple to the circuitry, the connector shaped to mate with a corresponding connector via motion that is orthogonal to the plane of the central area.

20. The light-emitting indicator of claim 18, wherein the control circuitry includes at least one driver chip positioned in a corner of the square that includes the light emitting diodes.

* * * * *